I. N. & J. H. GLAUBER.

STOP VALVE FOR WATER PIPES OR MAINS.

No. 11,431. Reissued July 10, 1894.

ATTEST
R. B. Moser.
G. S. Schaffer

BY
H. G. Fisher.

INVENTORS
Isaac N. Glauber.
Joseph H. Glauber.
ATTORNEY

THE NORRIS PETERS CO., PHOTO-LITHO., WASHINGTON, D. C.

UNITED STATES PATENT OFFICE.

ISAAC N. GLAUBER AND JOSEPH H. GLAUBER, OF CLEVELAND, OHIO.

STOP-VALVE FOR WATER PIPES OR MAINS.

SPECIFICATION forming part of Reissued Letters Patent No. 11,431, dated July 10, 1894.

Original No. 459,201, dated September 8, 1891. Application for reissue filed September 4, 1893. Serial No. 484,786.

*To all whom it may concern:*

Be it known that we, ISAAC N. GLAUBER and JOSEPH H. GLAUBER, citizens of the United States, residing at Cleveland, in the county of Cuyahoga and State of Ohio, have invented certain new and useful Improvements in Stop-Valves for Water Pipes and Mains; and we do hereby declare that the following is a full, clear, and exact description of the invention, which will enable others skilled in the art to which it appertains to make and use the same.

Our invention relates to stop-valves for water pipes or mains, and the invention consists in the construction substantially as shown and described and particularly pointed out in the claims.

Figure 1:
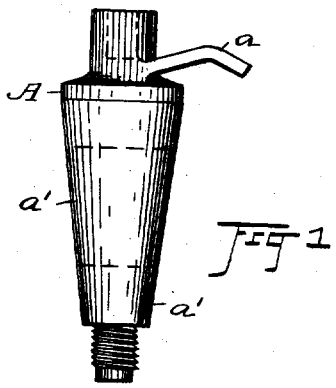
Figure 2:
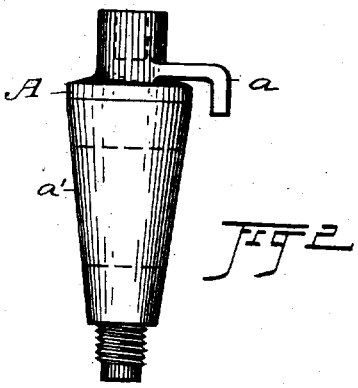
Figure 3:
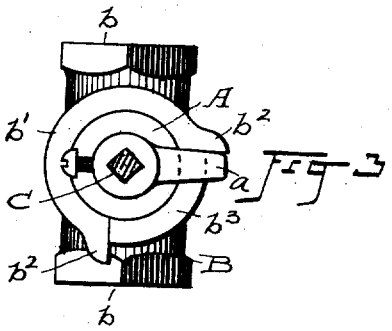
Figure 4:
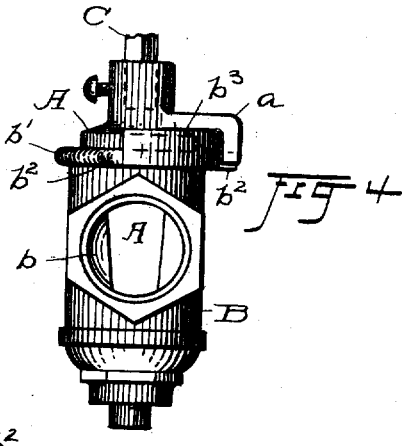
Figure 5:
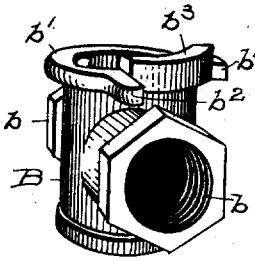

In the accompanying drawings, Figure 1 is a plain elevation of a shut off plug having a flexible arm projecting from the neck of the plug above the working surface thereof in such position as not to interfere with the turning down and finishing of said face, nor with fitting the plug to its seat as hereinafter fully set forth. Fig. 2 is a side elevation of the plug and its laterally projecting arm as they appear after the arm is bent into working position, as shown in Fig. 4. Fig. 3 is a plan view of the parts assembled, and Fig. 4 is a side elevation thereof, both views showing a cross section of the turning rod inserted in its seat in the end of the plug. Fig. 5 is a perspective view of the valve casing alone.

We are aware that in the broader sense the construction of a valve casing and a tapered plug seated therein and adapted to be used for the purposes of the plug herein shown and described is old and well-known, and we do not lay claim to originality so far as these two elements thus defined are concerned; but we are not aware that these elements were ever before known or made or possessed of the peculiar features of construction which are herein shown and described and which constitute our invention, as claimed.

In the drawings, Fig. 1, we show the plug A as it appears either when it comes from the mold or when finished for use, but with its arm —*a*— extended as it comes from the mold and remains until turned down into using position. This arm —*a*— is flexible and is integral with and projects from the neck of the plug above the wearing surface —*a'*— so as not to interfere with turning down and finishing said surface, and has its extremity extending laterally instead of being bent as in Fig. 2, so as to enable the plug to be turned around in its seat, as hereinafter more fully described.

B is the valve casing, provided with a tapered seat for the plug at right angles to the threaded openings —*b*— for the connecting pipes, as usual. This casing B has a flange or rim —*b'*— of more or less width, and laterally projecting stops —$b^2$— at its top at a suitable distance apart and which serve to fix the limits of rotation for the plug A. Between the said stops is shown a rib —$b^3$— which, as illustrated herein, extends from one stop to the other and is higher than the surface of said flange —*b'*—, as clearly seen in Figs. 4 and 5.

The valve as a whole is made out of brass, lead, or any other suitable and homogeneous metal, malleability being necessary in the part carrying the arm so that a flexible arm will be produced, and homogeneity is necessary so that the parts can be finished and made fluid tight in the manner described. If the metal were not malleable the arm of course would not be malleable or flexible, and this would detract materially from the simplicity and cheapness of the construction; or if an otherwise substantially similar construction were employed but with the malleable feature omitted, it would entail the attachment of the arm in some way as a separate piece, which would detract from simplicity and cheapness of construction.

Two important purposes are served by the foregoing construction: First, it is necessary, by reason of the location of these valves at a considerable distance beneath the surface of the earth where they cannot be personally observed, to provide fixed stops for the plugs which will tell when the valve is open and when it is closed. This is accomplished by the laterally projecting arm on one member engaging the stops on the other member, one stop being placed to indicate the open position and the other to indicate the closed position of the plug. Secondly, owing to the heavy weight and pressure of the turning rod C upon the long tapered plug and the natural tendency of said plug to settle tightly into its seat the plug becomes so firmly locked as to be immovable except with great effort and strain. To relieve the effect of this downward pressure upon the plug we have conceived the idea of providing a bearing at the side of the valve which will take the downward pressure and thus relieve the tapering water-sealing surface of the load. This bearing consists in the arm —*a*— and the rib, —$b^3$—, on which the arm is caused to rest when the valve is seated. The arm, being malleable, but yet firm, can be bent to any desired position, according as the valve enters its seat at more or less depth. Experience shows that hardly any two valves are turned so as to seat just alike, and they are liable to wear so as to seat more deeply. The malleable and flexible arm is admirably adapted to fix the rest or bearing as each case may require and to change it when necessary. Obviously a differently arranged bearing might be employed without departing from the spirit of the invention, but the construction shown is preferred.

Having the parts A and B provided in the rough, the first step necessary to adapt the said parts to one another is to turn off and finish their wearing surfaces in a lathe as usual. But it is well-known in this art that these parts cannot all be cast and turned to such perfect uniformity that different plugs and different casings can be used interchangeably. Hence, after turning and finishing any given plug and plug seat, it is necessary that such plug should be turned or rotated around and back in its own seat and finally fitted and adapted thereto by such turning, and every valve has to undergo a like treatment until, by actual testing, it is found to be absolutely fluid tight. Hence, also, the arm —*a*— must be kept out of locking position with the stops on the other member not only until the valve surfaces are turned off in the lathe, but also until the plug has been ground into the valve seat. Otherwise such grinding into the seat would be impossible and would defect the invention. Finally, however, after the parts are turned in the lathe and ground one into the other they are ready for use, and when put together for the trade may have the arm —*a*— bent into engaging position at once, or the arm may remain extended until the valve is set by the plumber. In any case the parts are united as shown in Fig. 4 before marketing.

Having thus described our invention, what we claim as new, and desire to secure by Letters Patent, is—

1. A tapering shut off plug having a flexible arm formed integral therewith near its upper end, and the said upper end constructed to be engaged by a key for turning the said plug, in combination with the casing for the plug having stops engaged by said arm, substantially as set forth.

2. The valve casing provided at its top with lateral stops to limit the rotation of the plug, in combination with the plug seated in said casing and having a flexible arm integral therewith at its upper end, said arm extending substantially at right angles from the plug and having its extremity bent down between said lateral stops, substantially as set forth.

3. In shut off valve mechanism for street pipes, a valve casing constructed to make pipe connections, in combination with a shut off plug seated in said casing and one of said parts cast with a lateral projection and the other part cast with a flexible arm constructed to be bent into position to engage said projection, and thus limit the rotation of the plug, substantially as set forth.

ISAAC N. GLAUBER.
JOSEPH H. GLAUBER.

Witnesses:
H. T. FISHER,
GEORGIA SCHAEFFER.